Jan. 24, 1961   T. WHEATLEY   2,969,492
FULL PASSAGE CLAPPER VALVE
Filed Jan. 30, 1959   2 Sheets-Sheet 1
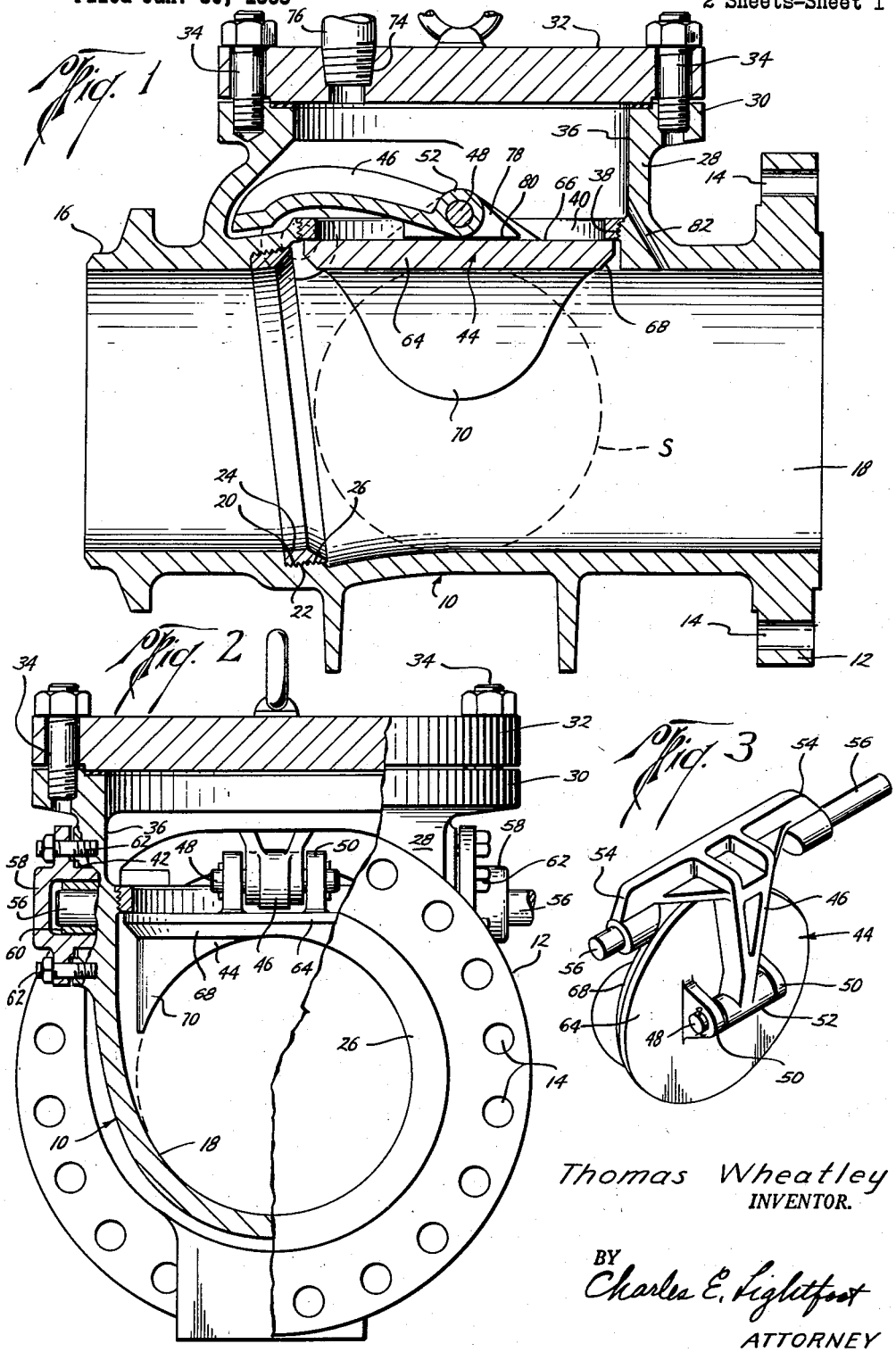
Thomas Wheatley
INVENTOR.
BY
Charles E. Lightfoot
ATTORNEY

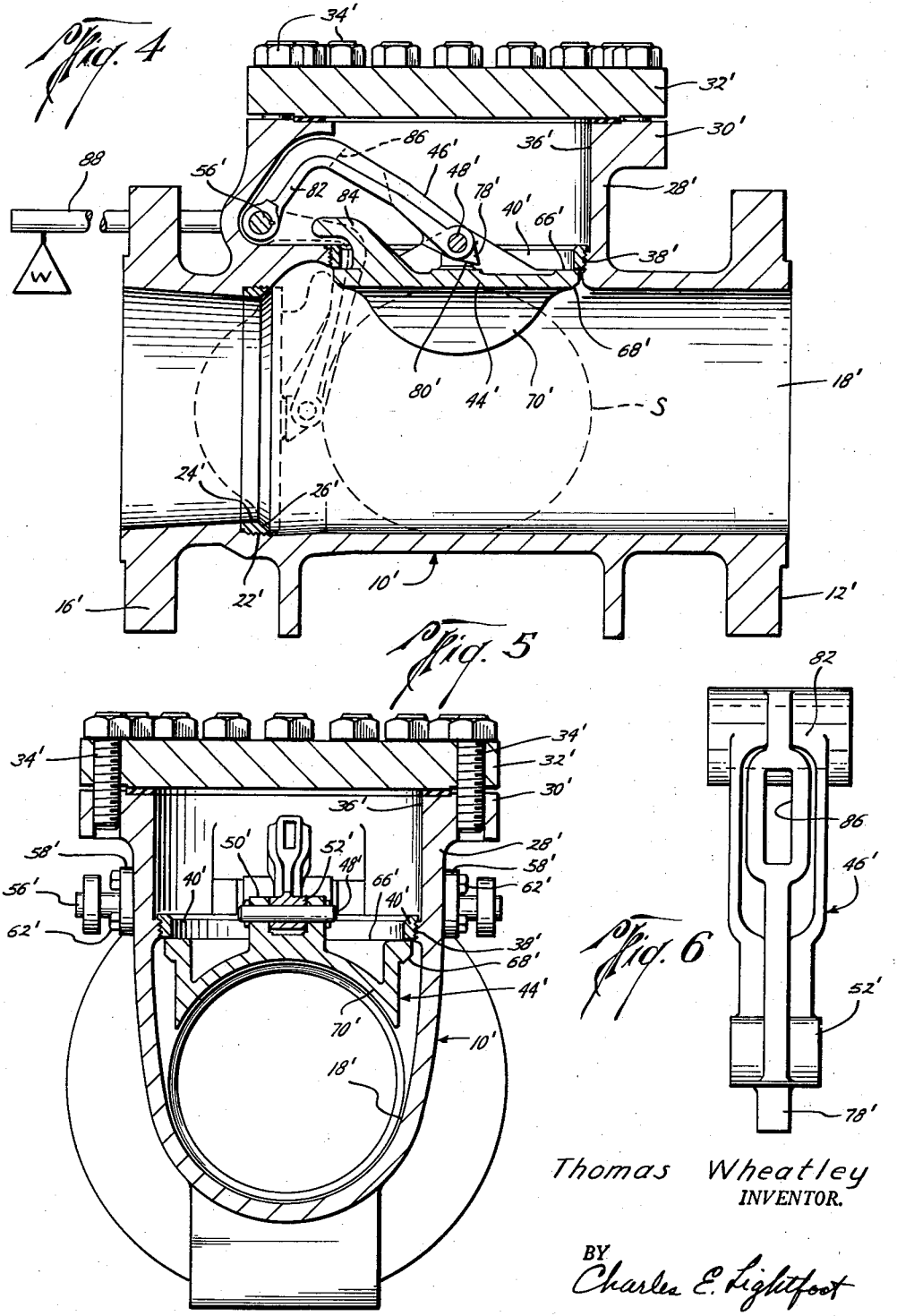

United States Patent Office 2,969,492
Patented Jan. 24, 1961

2,969,492
FULL PASSAGE CLAPPER VALVE

Thomas Wheatley, Houston, Tex., assignor, by mesne assignments, to Mission Manufacturing Company, Houston, Tex., a corporation of Texas Filed Jan. 30, 1959, Ser. No. 790,225

3 Claims. (Cl. 137—527.4)

This invention relates to valves, and more particularly to a valve of the clapper type for use in conduits, pipe lines, and the like for the purpose of providing a fully open passageway when the valve is in open position, through which a separator or the like may pass with fluid flowing through the pipe line.

In the operation of pipe lines for the transportation of oil, or the like, it is often desirable to use such lines for the movement of fluids of widely different character, such as various grades or weights of oil, without commingling the same. Often oil from different sources, which may vary substantially in composition or quality, is passed through the same line at different times and it becomes necessary to provide some means for maintaining the various grades separated for purposes of distribution or accounting.

For this purpose barrier elements, such as balls of rubber or other resilient materials are introduced into the line, which are shaped and proportioned for sealing engagement with the internal wall of the pipe to maintain the different fluids out of contact with each other and to be propelled through the pipe under the pressure exerted by the flowing fluid.

In the maintenance of such pipe lines, it is also customary to introduce various kinds of scrapers and cleaning devices to be moved through the line by fluid pressure and which are designed to engage and clean the internal wall of the pipe.

The use of barrier elements as cleaning devices of this character, to be propelled through the line by fluid pressure, is attended by the difficulty that such devices may become stuck in the pipe at locations where irregularities occur in the interior of the pipe, and do not readily pass through valves of the usual type employed in such lines. The failure of pressure fluid operated barriers or separators is especially likely to occur when such devices are employed in pipe lines which are equipped with valves of the clapper or hinged disk type due to the clapper or disk being positioned in a partially open condition at the time the movable barrier reaches the valve, or because of leakage of fluid through the valve body past the barrier when the barrier moves into the valve.

The present invention has for an important object the provision of a valve of the clapper or hinged disk type by which the above disadvantages may be overcome and which is designed to permit the passage therethrough of a movable barrier or separator under the influence of the pressure of fluid flowing through a pipe line.

Another object of the invention is the provision of a valve of the clapper or hinged disk type wherein the clapper is shaped to form with the valve body a passageway of substantially the same internal size and shape as those of the pipe line when the valve is in its open position to permit the ready passage therethrough of a movable barrier or separator.

A further object of the invention is to provide a valve of the kind referred to wherein the clapper or disk is shaped to form with the valve body a substantially cylindrical continuation of the internal wall of the pipe line through the valve body with which a movable barrier shaped for sealing engagement with the internal wall of the pipe is sealingly engageable as the barrier passes through the valve.

Another object of the invention is the provision in a valve of the character mentioned of means for preventing the valve clapper from assuming a position which would interfere with the ready passage of the barrier element or separator through the valve body or casing.

A further object of the invention is to provide a valve of the kind referred to embodying means for holding the valve clapper in proper position to move into closing contact with the valve seat to prevent the valve from sticking in a partially closed position.

Another object of the invention is the provision in a valve of the hinged clapper or disk type of means for normally holding the clapper in a fully open position to maintain the valve in condition for the passage therethrough of a barrier element or separator.

A further object of the invention is to provide a valve of the kind mentioned having a cavity or recess in the valve body into which the valve clapper is movable upon opening of the valve to position the valve to permit the passage through the body of a barrier element or separator, and including means for establishing fluid flow communication between the interior of the cavity and the flowway of the valve to permit equalization of the pressure on the opposite sides of the clapper when the clapper is in open position.

A still further object of the invention is to provide a valve of the type referred to which is of simple design and rugged construction and wherein the parts are easily replaceable for purposes of maintenance and repair.

The above and other important objects and advantages of the invention may best be understood from the following detailed description, constituting a specification of the same when considered in conjunction with the annexed drawings, wherein—

Figure 1 is a longitudinal vertical, central cross-sectional view of a preferred embodiment of the invention, showing the valve in open position in condition for the passage therethrough of a barrier element or the like;

Figure 2 is a fragmentary end elevational view, partly broken away and partly in cross-section, looking at the right hand end of the valve as illustrated in Figure 1;

Figure 3 is a perspective view of the clapper structure of the valve of the invention as illustrated in Figures 1 and 2, on a somewhat reduced scale, removed from the surrounding parts of the valve;

Figure 4 is a view similar to that of Figure 1, illustrating a somewhat different form of the invention;

Figure 5 is a view similar to that of Figure 2, illustrating the form of the invention drawn in Figure 4; and Figure 6 is a top plan view, on a somewhat enlarged scale of the clapper supporting arm of the invention as illustrated in Figures 4 and 5 removed from the surrounding parts of the valve.

Referring now to the drawings in greater detail, the valve of the invention has a housing or casing 10, which may take the form of a casting, provided at one end with an external annular flange 12, which is perforated, as indicated at 14 to receive bolts, or the like, by which the body or housing may be connected to the adjacent end of a section of pipe having a similar external flange.

At its other end, the body or housing may be shaped to be fitted into and suitably attached to the adjacent end of another pipe section, whereby the body is connected into a flow line. The body has a flowway 18 therethrough, and is formed with an annular recess 20, surrounding the flowway, and which may be internally threaded, as indicated at 22 to receive an annular externally threaded seat forming element 24, having a bevelled end face 26, positioned for engagement with the seating face of a valve clapper to close the flowway.

The valve body 10 is also formed with an upwardly extending annular portion 28, having an external annular flange 30, upon which the valve bonnet 32 is seated and to which the bonnet is removably secured, as by means of bolts 34. The upwardly extending portion 28 of the valve body forms a cavity 36, which opens into the flowway 18 through an opening 38, which is internally threaded to receive an annular seat forming element 40, positioned to be closed by the valve clapper when the clapper is in open position.

The valve body may also be provided with opposite side openings, such as that indicated at 42 in Figure 2, for the reception of suitable bearings by which the valve clapper is hingedly supported in the body.

Within the body or housing, a valve clapper 44 is hingedly connected to one end of an arm 46, as by means of a hinge pin 48, which extends through perforated lugs 50 on the clapper, and through a perforated enlargement 52 formed on the end of the arm 46. The arm 46 is formed with side extensions 54, from which pintles 56 extend outwardly through the openings 42 in the valve body, through suitable bearing means positioned therein, to pivotally support the arm on the body. One of the pintles 56 extends outwardly beyond the exterior of the body, for the attachment thereto of suitable counterbalancing means, not shown, or for other purposes.

The bearings for the pintles may conveniently take the form of caps 58, within which bushing 60 are located in surrounding relation to the pintles, and these caps may be suitably secured to the body, as by means of bolts 62, whereby the bearings may be easily removed and replaced for purposes of maintenance and repair.

The clapper 44 is formed with a disc-shaped portion 64, having one face 66 thereof shaped for seating contact with the seat forming element 40 in the cavity 36, to close the cavity when the valve is in open position, and another sealing face 68, which is annular and bevelled for seating and sealing contact with the bevelled sealing surface 26 of the valve seat element 24 when the valve is in closed position. The sealing surface 26 faces endwise of passageway 18 and cooperates with the valve member to prevent flow through the valve when the valve member is seated.

The clapper 44 also has a portion 70 provided by a pair of ears on one side of the valve member and internally of sealing surface 68. The confronting surfaces of these ears form a cylindrical surface whose axis is parallel to the axis of passageway 18 when the valve member is open. This cylindrical surface in effect forms with the internal wall of the body a nearly continuous cylindrical surface, when the valve is in fully open position, so that the internal wall of the passageway 18 is of substantially cylindrical shape and of substantially uniform diameter throughout its entire length when the valve is open.

The bonnet 32 may be provided with an internally threaded opening 74, into which an outlet or branch pipe 76 may be threaded, if desired, through which fluid from the passageway 18 may be conducted for the purpose of taking samples, or for other purposes.

The arm 46 may be formed with a lug or extension 78, best seen in Figure 1, which has a face 80 positioned for engagement with the face 66 of the clapper, to limit rotational movement of the clapper about the pin 48, so that the clapper will be held against movement to a position in which the clapper could contact the seat forming element 24 at an angle to hold the clapper out of fully closed position on the seating face 26 upon closing movement of the valve. The valve body is provided with a passageway 82, which is in communication with the interior of the flowway 18 and with the interior of the cavity 36 to permit the inflow and outflow of fluid into and out of the cavity, whereby the pressure of fluid on the clapper will be equalized when the clapper is in open position.

In the operation of the invention, constructed as described above, a barrier element or separator, which may take the form of a ball of rubber or the like, of a size somewhat greater in diameter than the internal diameter of the flowway 18 and the pipe line, is introduced into the line at some convenient point, to be propelled along within the line by the pressure of the flowing fluid therein. The ball S will be introduced into the line, ordinarily, after the line has been used for the transportation of one kind or grade of fluid, such as oil, and in advance of another grade or kind of fluid to be transported through the line, so that the different grades or kinds of fluid will be effectively separated and prevented from co-mingling by the barrier element. Because of the size and physical characteristics of the barrier element, it will be apparent that the same will be forced into sealing contact with the internal wall of the pipe to effectively close the pipe at the location where the different fluids are to be maintained separate.

When the barrier element reaches the valve in its movement along the pipe line, the valve clapper 44 will normally be in its fully open position as illustrated in Figure 1, in which position the clapper forms with the internal wall of the passageway a substantially continuous cylindrical internal surface along which the barrier element moves in sealing contact therewith, so that the barrier element may readily pass through the valve without danger of becoming stuck therein. Moreover, because of the relatively close fit between the clapper and the body of the valve when the clapper is in open position, very little clearance is necessary between the parts, so that there will be insufficient leakage of fluid past the barrier element when the barrier element is in the valve to cause any substantial drop in pressure in the fluid by which the barrier element is propelled through the pipe line, so that there is little danger of the barrier element failing to pass through the valve.

A somewhat modified form of the invention as illustrated in Figures 4, 5 and 6, wherein the general arrangement of the valve body and clapper is similar to that previously described.

In this modified form of the invention, however, the support arm for the clapper is of angle shape, having one arm 82 thereof, which is positioned to lie in a substantially horizontal position in the body when the clapper is closed, and which extends upwardly within the cavity 36' when the clapper is in its open position. The clapper 44' is formed with an angle shaped lug 84, positioned to extend upwardly into the cavity 36' when the clapper is in its open position, and which coacts with the support arm to maintain the clapper in a position for proper seating engagement with the seating face 26' of the seat forming element 24' when the clapper reaches closed position, and to prevent the clapper from rotating about the pin 48' to a position to cause the clapper to be partly open when the clapper is in engagement with the seat forming element. The clapper supporting arm 46' is provided with an opening 86 therethrough which is positioned to receive the free end portion of the lug 84, when the clapper is in closed position, so that the arm and lug do not interfere with the opening and closing movements of the clapper but coact to prevent the clapper from assuming a position which would prevent proper closing of the valve. The lug 84 is also shaped in a manner to coact with the seat forming element 40', as the clapper moves toward open position to prevent the clapper from assuming a position which would prevent the clapper from properly seating on the element 45.

The form of the invention illustrated in Figures 4, 5, and 6 may also include counter balancing means for the valve clapper, which may conveniently take the form of a shaft 88, which is fixed at one end to one of the pintles or extensions 56', and is provided with a suitable weight such as that diagrammatically illustrated at W in Figure 4 to balance the weight of the clapper, to hold the clapper in its fully open position, as illustrated in Figure 4.

This modified form of the invention is used in the same manner as previously described in connection with the form of the invention illustrated in Figures 1, 2 and 3, the valve clapper being normally in its fully open position, as best seen in Figure 4, with the portion 70' thereof positioned to form with the internal wall of the passageway 18' an internal cylindrical surface of substantially uniform diameter and which is nearly continuous throughout the length of the passageway. With the valve thus positioned, it will be apparent that the barrier element S will be moved through the valve by the pressure of the fluid flowing through the pipe line, without danger of the barrier becoming stuck in the valve.

It will thus be apparent that the invention, constructed and operated in the manner described above, provides a valve of the hinged, clapper or desk type, which is particularly useful in connection with pipe lines through which it is desired to move barrier or separator elements to maintain different grades or kinds of fluids in a separated condition, and also through which it may be desired to pass suitable scraping or cleaning equipment, under the influence of the pressure of the fluid flowing through the line, without the danger of such equipment becoming stuck in the valve.

The invention has been disclosed herein in connection with certain specific embodiments of the same, but it will be understood that these are intended by way of example only, and that various changes may be made in the structure and arrangement of the various parts, within the scope of the appended claims.

Having thus clearly shown and described the invention, what is claimed as new and desired to secure by Letters Patent is—

1. A valve comprising, a valve housing having a passageway therethrough, a valve seat in the housing surrounding the passageway, said seat having a sealing surface facing endwise of said passageway, a cavity in the wall of the housing adjacent said seat, and a clapper valve member having an annular sealing surface thereon, means for mounting said valve member in the housing for movement between a closed position in which said valve member sealing surface engages said seat sealing surface and an open position in which the valve member moves in part into said cavity, said clapper valve member including a pair of ears formed on one side of the valve member inside of said valve member sealing surface and having confronting surfaces which are contoured to form an arcuate surface on the valve member whose axis extends parallel with the axis of the passageway with the valve member in fully open position, said arcuate surface forming in effect a part of the wall of the passageway when the valve member is in open position, said ears extending through the valve seat sealing surface when the valve member is seated.

2. The valve of claim 1 wherein the means for mounting the clapper valve member is an arm hingedly connected at one end to the housing and hingedly connected at the other end to the clapper valve member, and means are provided on the clapper valve member and arm for limiting rocking movement of the valve member relative to the arm.

3. The valve of claim 1 in combination with counterbalancing means attached to the means for mounting the valve member.

References Cited in the file of this patent

UNITED STATES PATENTS

| | | |
|---|---|---|
| 695,046 | Granton | Mar. 11, 1902 |
| 1,000,719 | Cram | Aug. 15, 1911 |
| 1,956,691 | McCune | May 1, 1934 |
| 2,447,842 | Cameron | Aug. 24, 1948 |
| 2,496,898 | Thompson | Feb. 7, 1950 |
| 2,827,259 | Kindt | Mar. 18, 1958 |

FOREIGN PATENTS

| | | |
|---|---|---|
| 2,385 | Great Britain | Feb. 6, 1900 |
| 329,576 | Great Britain | May 22, 1930 |